(12) United States Patent
Sakai et al.

(10) Patent No.: US 9,982,670 B2
(45) Date of Patent: May 29, 2018

(54) FUEL PUMP

(71) Applicant: DENSO CORPORATION, Kariya, Aichi-pref. (JP)

(72) Inventors: Hiromi Sakai, Kariya (JP); Daiji Furuhashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 98 days.

(21) Appl. No.: 15/153,951

(22) Filed: May 13, 2016

(65) Prior Publication Data

US 2016/0333875 A1    Nov. 17, 2016

(30) Foreign Application Priority Data

May 14, 2015   (JP) .................................. 2015-99405

(51) Int. Cl.

| | |
|---|---|
| *F01C 1/10* | (2006.01) |
| *F04C 2/08* | (2006.01) |
| *F04C 18/08* | (2006.01) |
| *F03C 2/08* | (2006.01) |
| *F04C 15/00* | (2006.01) |
| *F04C 2/10* | (2006.01) |
| *F04C 15/06* | (2006.01) |
| *F02M 59/14* | (2006.01) |
| *F01C 21/10* | (2006.01) |
| *F04C 11/00* | (2006.01) |

(52) U.S. Cl.
CPC .......... *F04C 15/0042* (2013.01); *F01C 21/10* (2013.01); *F02M 59/14* (2013.01); *F04C 2/102* (2013.01); *F04C 15/06* (2013.01); *F04C 11/008* (2013.01); *F04C 2210/1044* (2013.01)

(58) Field of Classification Search
CPC .............................. F04C 15/0042; F01C 21/10
USPC ......................................... 418/166, 171, 160
See application file for complete search history.

(56) References Cited

U.S. PATENT DOCUMENTS

| | | | | |
|---|---|---|---|---|
| 5,571,003 | A | * | 11/1996 | Tuckey ................. F04C 11/008 418/1 |
| 5,997,262 | A | * | 12/1999 | Finkbeiner ........... F02M 37/041 417/410.4 |
| 9,249,806 | B2 | * | 2/2016 | Talaski .................... F04D 5/005 |

(Continued)

FOREIGN PATENT DOCUMENTS

| | | |
|---|---|---|
| JP | 2009-250087 | 10/2009 |
| JP | 2013-133931 | 7/2013 |

*Primary Examiner* — Deming Wan
(74) *Attorney, Agent, or Firm* — Nixon & Vanderhye P.C.

(57) ABSTRACT

A fuel pump includes rotors that rotate, a pump housing that defines a rotor housing chamber that rotatably houses the rotors, and an outer circumferential side housing that includes a cylindrical portion formed in a cylindrical shape that surrounds the pump housing from an outer circumferential side and a narrowing potion having that narrows down with respect to the cylindrical portion. The fuel pump sucks fuel into the rotor housing chamber and then discharges the fuel due to the rotor rotating. A pump cover of the pump housing includes an inlet port that sucks fuel into the rotor housing chamber, and a sliding surface portion on which the rotors slide. An outer circumferential portion of the pump cover includes a joining portion joined to the narrowing portion, and a recessed portion that is recessed adjacent to the joining portion, the recessed portion allowing the outer circumferential portion to elastically deform.

8 Claims, 11 Drawing Sheets

(56) References Cited

U.S. PATENT DOCUMENTS

2008/0019856 A1 1/2008 Asai
2014/0079578 A1 3/2014 Irie et al.

* cited by examiner

FUEL PUMP

CROSS REFERENCE TO RELATED APPLICATION

The present application is based on Japanese Patent Application No. 2015-99405 filed on May 14, 2015, disclosure of which is incorporated herein by reference.

TECHNICAL FIELD

The present disclosure relates to a fuel pump that intakes fuel into a rotor housing chamber then discharges the fuel.

BACKGROUND

Conventionally, it is known that a fuel pump intakes fuel into a rotor housing chamber and then discharges the fuel. A fuel pump disclosed in JP 2009-250087 A includes a rotor that rotates, a pump housing, a cylindrical portion, and an outer circumferential side housing. The pump housing interposes the rotor from both side in the axial direction, and defines a rotor housing chamber that rotatably houses the rotor. The cylindrical portion is formed in a cylindrical shape that surrounds the pump housing from the outer circumferential side. The outer circumferential side housing includes a narrowing portion that has a diameter which narrows down compared to the cylindrical portion.

Here, a groove is formed in the outer circumferential side housing. The groove makes a round along the circumferential direction of this outer circumferential side housing. Then, when manufacturing the fuel pump, by folding the narrowing portion from the groove, the narrowing portion is joined with a joining portion of the pump housing. In other words, since the thickness of the outer circumferential side housing becomes thinner at the narrowing portion, the narrowing portion and the joining portion are joined together without strongly pressing the narrowing portion into the joining portion, and making it difficult for springback to occur. As a result, distortions in the pump housing are suppressed.

SUMMARY

However, according to the configuration of JP 2009-250087 A, the groove is provided in the outer circumferential side housing, thus when used in a high temperature environment for example, if the narrowing portion opens in the outer circumferential side once, it is difficult for the narrowing portion to return to as before by elastic reaction force, thus tension force decreases. There is a concern that when tension force decreases in this manner, pump functionality may also decrease.

In the above described configuration, in order to maintain tension force when the narrowing portion opens, it is necessary after all to strongly press the narrowing portion against the joining portion. If this is done, a portion of a sliding surface portion on which the rotor slides in the pump housing may be elevated toward the rotor housing chamber due to a force received from the narrowing portion. Accordingly, a sliding friction when the rotor is rotating may increase. As a result, pump efficiency may decrease.

In view of the above, it is an object of the present disclosure to provide a fuel pump that suppresses pump efficiency from decreasing.

A fuel pump of the present disclosure includes a rotor that rotates, a pump housing that interposes the rotor from both sides in an axial direction, the pump housing defining a rotor housing chamber that rotatably houses the rotor, and an outer circumferential side housing that includes a cylindrical portion formed in a cylindrical shape that surrounds the pump housing from an outer circumferential side, and a narrowing potion having a diameter that narrows down with respect to the cylindrical portion, wherein fuel is sucked into the rotor housing chamber and then discharged due to the rotor rotating, the pump housing includes a fuel port that sucks fuel into and discharges fuel out of the rotor housing chamber, and a sliding surface portion on which the rotor slides, and an outer circumferential portion of the pump housing includes a joining portion joined to the narrowing portion, and a recessed portion that is recessed adjacent to the joining portion, the recessed portion allowing the outer circumferential portion to elastically deform.

Due to such a disclosure, the recessed portion is recessed adjacent to the joining portion in the outer circumferential portion of the pump housing. Due to this, even when the joining portion is joined to the narrowing portion of the outer circumferential side housing, the recessed portion allows the outer circumferential portion to elastically deform. Accordingly, forces received from the narrowing portion may be absorbed, and it is difficult for this force to affect the sliding surface portion. Specifically, by suppressing a portion of the sliding surface portion from protruding toward the rotor housing chamber, it is possible to suppress a sliding friction when increasing when the rotor rotates and slides on the sliding surface portion. Due to this, the rotor smoothly rotates, while fuel is sucked into the rotor housing chamber and then discharged. Due to the above, it is possible to provide a fuel pump that suppresses pump efficiency from decreasing.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
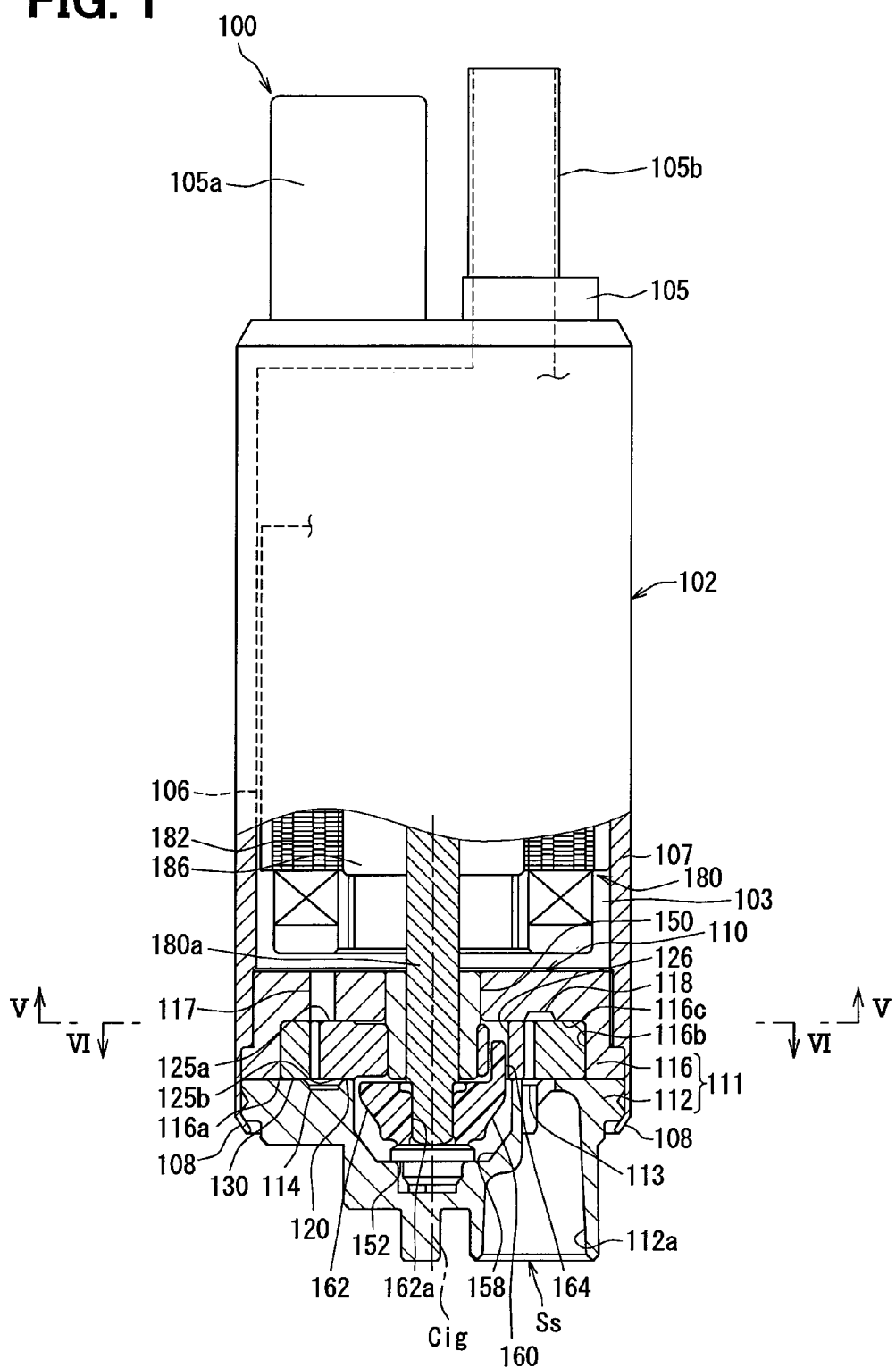
FIG. 1 is a partial cross sectional front view of a fuel pump according to a first embodiment.

Next, a plurality of embodiments of the present disclosure will be explained with reference to the figures. Further, corresponding component elements of each embodiment are denoted with the same reference numeral, and overlapping explanations may be omitted. If only a portion of the configuration of an embodiment is explained, regarding the other portions of this configuration, the configurations of other embodiments previously explained may be applied. Further, aside from combinations of configurations clearly explained in each embodiment, at long as no particular problem occurs during a combination, a plurality of embodiments may be partially combined with each other even if not clearly described.

First Embodiment

FIG. 1 shows a fuel pump 100 of a first embodiment of the present disclosure. The fuel pump 100 is a positive displacement trochoid pump. Further, the fuel pump 100 is mounted in a vehicle, and is a diesel pump used to pump diesel fuel which has higher viscosity than gasoline, and which is used as a fuel for an internal combustion engine. The fuel pump 100 includes an outer circumferential side housing 102, an electric motor 180, and a pump body 110. According to such a fuel pump 100, a rotating shaft 180a of the electric motor 180 is rotatably driven. Using the driving force of the rotating shaft 180a, an inner rotor 120 and an outer rotor 130 of the pump body 110, which defines a rotor housing chamber 156, rotate. As a result, diesel fuel is sucked into this rotor housing chamber 156 and pressurized, and then discharged out of the rotor housing chamber 156.

The outer circumferential side housing 102 is formed of, for example, metal, and includes a cylindrical portion 107, a narrowing portion 108, and a side cover 105. The cylindrical portion 107 is formed in a cylindrical shape that surrounds the pump body 110 and the electric motor 180 from an outer circumferential side in an arrangement in which the pump body 110 and the electric motor 180 are lined up in an axial direction. The narrowing portion 108 is disposed over the entire circumference of an end portion at the pump body 110 side of the outer circumferential side housing 102. The narrowing portion 108 has a shape that narrows down in diameter with respect to the cylindrical portion 107 by being bent toward the inner circumferential side with respect to the cylindrical portion 107. The side cover 105 is formed to project out at an end portion of the electric motor 180 side of the outer circumferential side housing 102. In addition, a discharge port 105b is provided in this side cover 105, and fuel which is sucked into and pressurized in the pump body 110 is discharged to outside from this discharge port 105b.

The electric motor 180 is housed within a motor housing portion 103 of the outer circumferential side housing 102. In the present embodiment, the electric motor 180 is an inner rotor type brushless motor arranged with magnets forming 4 poles at a rotor 186 and coils forming 6 slots at a stator 182. The stator 182 of the electric motor 180 is fixed with respect to the outer circumferential side housing 102. By being energized from an external circuit through an electric connector 105a, the rotor 186 of the electric motor 180 causes the rotating shaft 180a to rotate by rotating together.

In the present embodiment, for example with the vehicle ignition is ON, or if an accelerator pedal of the vehicle is depressed, then as a result the electric motor 180 performs a positioning control that causes the rotating shaft 180a to rotate in a driving rotation side or a driving rotation opposite side. Thereafter, the electric motor 180 performs a driving control that causes the rotating shaft 180a to rotate in the driving rotation side from the position determined during the positioning control. The driving rotation side indicates a positive direction of a rotation direction Rig described later. The driving rotation opposite side indicates a negative direction of the rotation direction Rig.

Next, the pump body 110 will be explained in detail using FIGS. 2 to 6. The pump body 110 mainly includes a pump housing 111, the inner rotor 120, a joint member 160, and the outer rotor 130. The pump housing 111 overlaps a pump cover 112 with a pump casing 116 in the axial direction to interpose the inner rotor 120 and the outer rotor 130 from both sides in the axial direction, and defines the rotor housing chamber 156 which rotatably houses the inner rotor 120 and the outer rotor 130.

The pump cover 112 shown in FIGS. 1 to 4 is a component of the pump housing 111. The pump cover 112 is formed in a wear resistant disc shape by performing surface treatment such as plating on a base material made from a rigid metal such as steel material. The base material of the pump cover 112 may be, for example, steel material having a carbon content of 0.05% or higher of grades S20C through S10C as defined in Japanese Industrial Standard (JIS) G 4051:2009. According to the pump cover 112, a protruding portion 112d protrudes out from an end portion of the outer circumferential side housing 102 that interposes the electric motor 180 in the axial direction opposite from the side cover 105.

Figure 3:
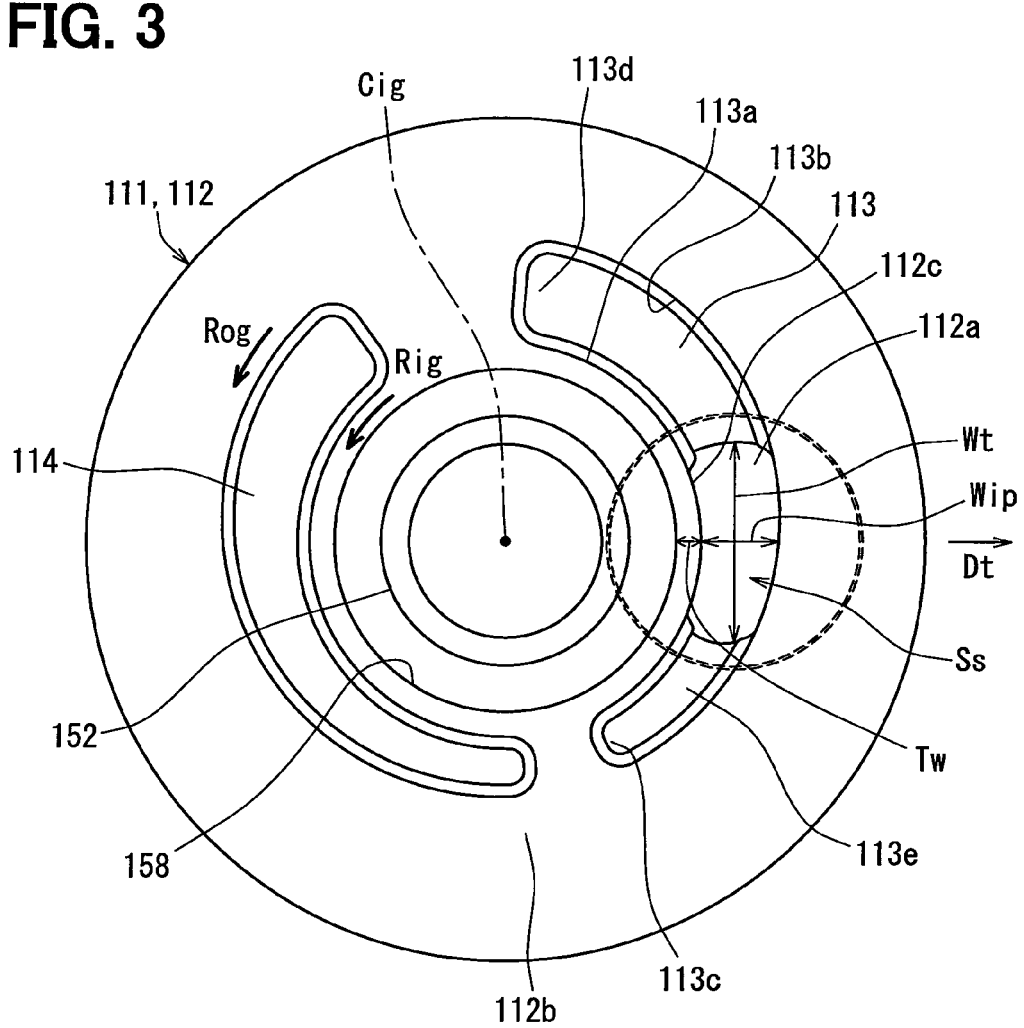
FIG. 3 is a directional view showing a pump cover from the III direction of FIG. 2.

The pump cover 112 forms an inlet port 112a and an intake passage 113 in order to intake fuel from outside. The inlet port 112a is a cylindrical hole shaped fuel port, and the intake passage 113 is an arc-shaped groove. The inlet port 112a is eccentrically disposed in an inlet port eccentric direction Dt with respect to an inner center line Cig of the inner rotor 120 which is a center of the pump cover 112. An opening point Ss is offset from the inner center line Cig and penetrates along the axial direction. The intake passage 113 opens toward the rotor housing chamber 156 of the pump cover 112. As shown in FIG. 3, an inner circumferential edge portion 113a of the intake passage 113 extends with a length of less than a semicircle along the rotation direction Rig (also refer to FIG. 6) of the inner rotor 120. An outer circumferential edge portion 113b of the intake passage 113 extends with a length of less than a semicircle along a rotation direction Rog of the outer rotor 130.

Figure 2:
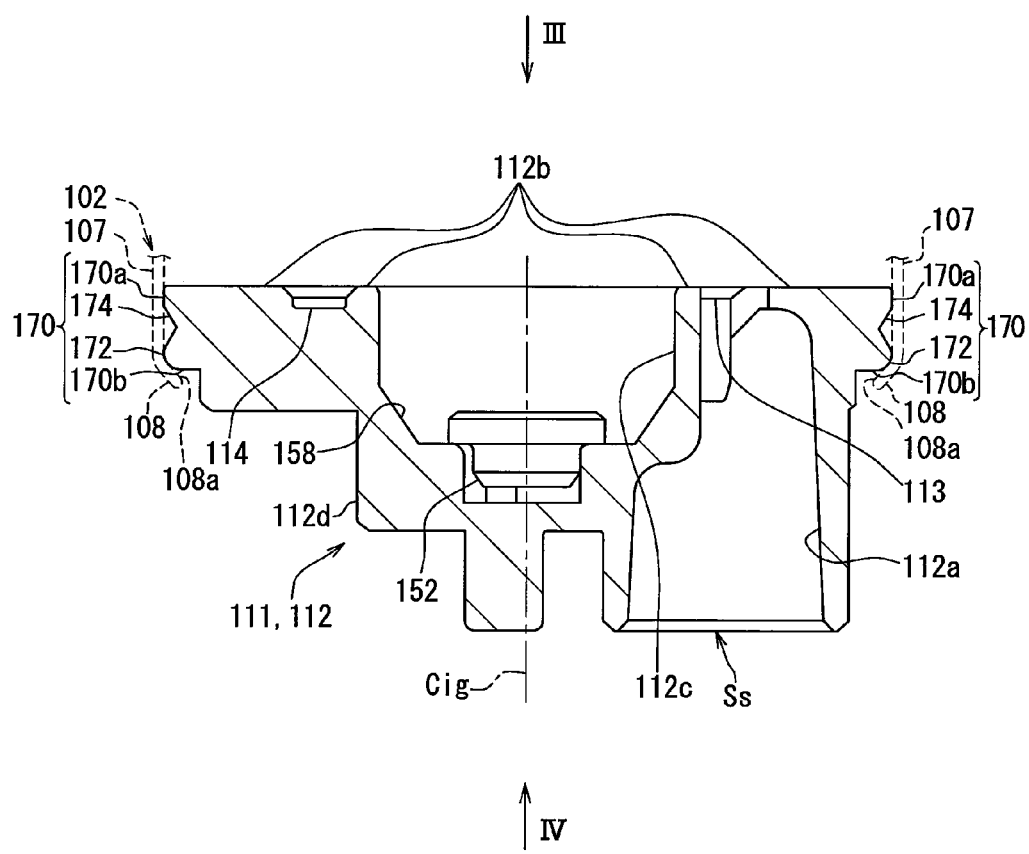
FIG. 2 is an expanded cross sectional view showing an expanded pump cover of FIG. 1.

Here, the intake passage 113 becomes wider as going from a start edge portion 113c toward an end edge portion 113d in the rotation directions Rig, Rog. Further, the intake passage 113 is in communication with the inlet port 112a due to the inlet port 112a opening into the opening point SS of a groove bottom portion 113e. In particular, as shown in FIGS. 2 and 3, in the entire region of the opening point Ss in which the inlet port 112a is open, a width Wt of the inlet port 112a is set to be larger than a width Wip of the intake passage 113.

Further, the pump cover 112 includes a joint housing chamber 158 that rotatably houses a body portion 162 of the joint member 160 at a location facing the inner rotor 120 on the inner center line Cig. The pump cover 112 includes a partition wall 112c between the inlet port 112a and the joint housing chamber 158 to separate these from each other. Here, a thickness dimension Tw of the partition wall 112c is smaller than the width Wt of the inlet port 112a and the width Wip of the intake passage 113.

Figure 5:
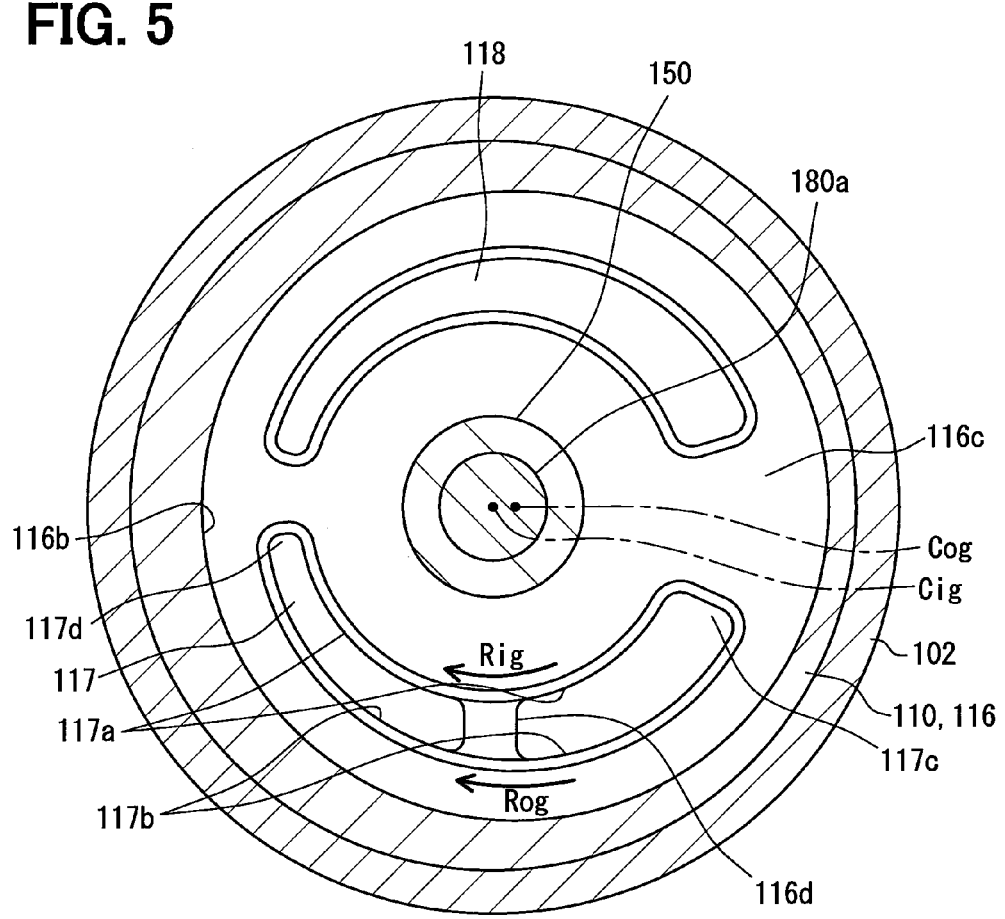
FIG. 5 is a cross sectional view along the V-V line of FIG. 1.
Figure 6:
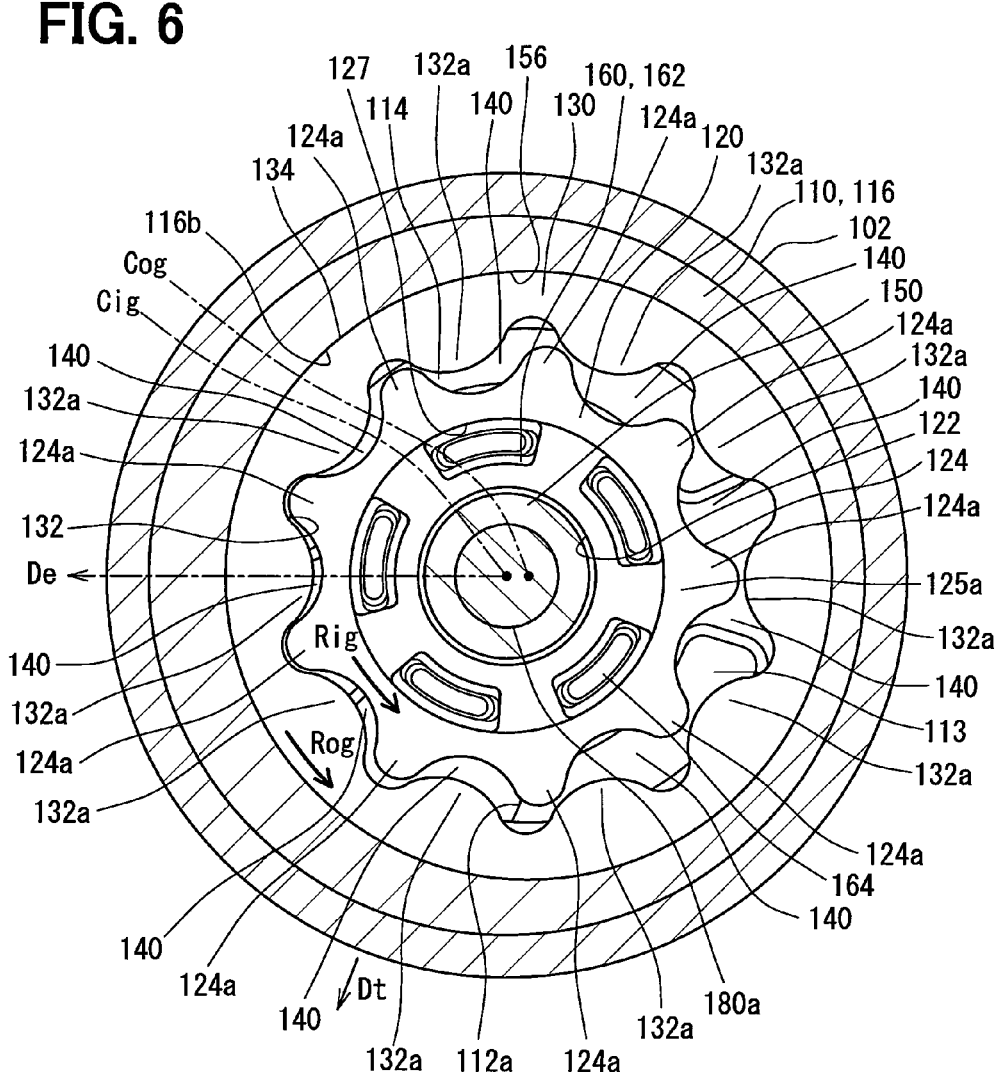
FIG. 6 is a cross sectional view along the VI-VI line of FIG. 1.

The pump casing 116 shown in FIGS. 1, 5, and 6 is a component of the pump housing 111. The pump casing 116 is, similar to the pump cover 112, formed in a wear resistant cylindrical shape having a closed bottom by performing surface treatment such as plating on a base material made from a rigid metal such as steel material. An opening portion 116a of the pump casing 116 is covered by the pump cover 112, and is airtight along the entire circumference. An inner circumferential portion 116b of the pump casing 116 is formed in a cylindrical hole shape eccentric from the inner center line Cig, as shown in FIGS. 5 and 6 in particular.

The pump casing 116 forms a discharge passage 117 as an arc-shaped hole in order to discharge fuel from the rotor housing chamber 156. The discharge passage 117 penetrates a recessed bottom portion 116c of the pump casing 116 along the axial direction. In particular, as shown in FIG. 5, an inner circumferential edge portion 117a of the discharge passage 117 extends with a length of less than a semicircle along the rotation direction Rig of the inner rotor 120. An outer circumferential edge portion 117b of the discharge passage 117 extends with a length of less than a semicircle along the rotation direction Rog of the outer rotor 130. Here, the discharge passage 117 decreases in width as going from a start edge portion 117c toward an end edge portion 117d in the rotation directions Rig, Rog.

Further, the pump casing 116 includes a reinforcing rib 116d in the discharge passage 117. The reinforcing rib 116d is integrally formed with the pump casing 116, and reinforces the pump casing 116 by straddling the discharge passage 117 in a direction intersecting the rotating direction Rig of the inner rotor 120.

An intake groove 118 is formed in a part of the recessed bottom portion 116c of the pump casing 116 which faces the intake passage 113 to interpose pump chambers 140 (described later) between the two rotors 120, 130. The intake groove 118 is an arc-shaped groove, and corresponds to the shape of the intake passage 113 projected in the axial direction. Due to this, in the recessed bottom portion 116c of the pump casing 116, the contours of the discharge passage 117 and the intake groove 118 are formed in a roughly line symmetrical manner.

Further, in the parts of the recessed bottom portion 116c other than the discharge passage 117 and the intake groove 118, the inner rotor 120 and the outer rotor 130 slide by rotating.

Conversely, as shown in FIG. 3 in particular, a discharge groove 114 is formed in a part of the pump cover 112 which faces the discharge passage 117 to interpose the pump chambers 140. The discharge groove 114 is an arc-shaped groove, and corresponds to the shape of the discharge passage 117 projected in the axial direction. As a result, in the rotor housing chamber 156 side of the pump cover 112, the contours of the intake passage 113 and the discharge groove 114 are formed to interpose the joint housing chamber 158 in a roughly line symmetrical manner.

Further, as also shown in FIG. 2, the pump cover 112 includes a flat surface shaped sliding surface portion 112b at the rotor housing chamber 156 side at locations other than the joint housing chamber 158, the intake passage 113, and the discharge groove 114. The inner rotor 120 and the outer rotor 130 slide on the sliding surface portion 112b by rotating. Due to this, the pump housing 111 includes the sliding surface portion 112b formed in the pump cover 112 and the inlet port 112a on the same side of the axial direction with respect to the rotor housing chamber 156. Here, the partition wall 112c between the inlet port 112a and the joint housing chamber 158 is exposed to the rotor housing chamber 156, and thus forms a part of the sliding surface portion 112b.

As shown in FIG. 1, a radial bearing 150 is fixedly fitted in the recessed bottom portion 116c of the pump casing 116 on the inner center line Cig, in order to bear the rotating shaft 180a of the electric motor 180 in the radial direction. Meanwhile, a thrust bearing 152 is fixedly fitted in the pump cover 112 on the inner center line Cig of the joint housing chamber 158, in order to bear the rotating shaft 180a in the axial direction.

The inner rotor 120 and the outer rotor 130 are so-called trochoid gears, each having teeth as trochoidal curves. Specifically, as shown in FIGS. 1 and 6, the inner rotor 120 shares the inner center line Cig with the rotating shaft 180a, and thus is arranged eccentrically within the rotor housing chamber 156. An inner circumferential portion 122 of the inner rotor 120 is borne by the radial bearing 150 in the radial direction, and at the same time, includes bearing surfaces 125a, 125b on each side in the axial direction borne by the recessed bottom portion 116c of the pump casing 116 and the sliding surface portion 112b of the pump cover 112, respectively.

Further, the inner rotor 120 includes insertion holes 126 recessed along the axial direction at locations facing the joint housing chamber 158. The insertion holes 126 are multiply arranged at equal intervals in the circumferential direction, and each insertion hole 126 penetrates until the recessed bottom portion 116c side.

Further, the joint member 160 shown in FIGS. 1 and 6 hooks up the rotating shaft 180a with the inner rotor 120, thereby causing the inner rotor 120 to rotate. The joint member 160 includes the body portion 162 and insertion portions 164. The body portion 162 is fitting with the rotating shaft 180a in a fitting hole 162a. The insertion portions 164 are multiply provided corresponding to each of the insertion holes 126. Specifically, the insertion holes 126 and the insertion portions 164 of the present embodiment are provided to avoid the numbers of poles and numbers of slots of the electric motor 180, in order to reduce the effects of torque ripple of the electric motor 180. In particular, in the present embodiment, 5 of each of the insertion holes 126 and the insertion portions 164 are provided, i.e., in prime numbers. Each insertion portion 164 extends along the axial direction from a location that is more toward the outer circumferential side than the fitting hole 162a of the body portion 162.

Each insertion portion 164 is inserted into a corresponding one of the insertion holes 126 with a gap. When the insertion portions 164 press against the insertion holes 126, the driving force of the rotating shaft 180a is transferred through the joint member 160 to the inner rotor 120. In other words, the inner rotor 120 is able to rotate about the inner center line Cig in the rotation direction Rig.

The inner rotor 120 includes a plurality of outward teeth 124a, which are lined up along the rotation direction Rig with even spacing, on an outer circumferential portion 124. Each outward tooth 124a is able to face each passage 113, 117 and each groove 114, 118 in the axial direction according to the rotation of the inner rotor 120, and thus the inner rotor 120 is suppressed from clinging onto the recessed bottom portion 116c and the sliding surface portion 112b.

As shown in FIGS. 1 and 6, the outer rotor 130 is eccentric with respect to the inner center line Cig of the inner rotor 120, and is arranged coaxially within the rotor housing chamber 156. Due to this, the inner rotor 120 is eccentric with respect to the outer rotor 130 in a rotor eccentric direction De, which is one radial direction of the outer rotor 130. An outer circumferential portion 134 of the outer rotor 130 is borne by the inner circumferential portion 116b of the pump casing 116, and at the same time is borne in both axial directions by the recessed bottom portion 116c and the sliding surface portion 112b. Due to these bearings, the outer rotor 130 is able to rotate about an outer center line Cog, which is eccentric from the inner center line Cig, in a constant rotation direction Rog.

The outer rotor 130 includes a plurality of inward teeth 132a, which are lined up along the rotation direction Rog with even spacing, on an inner circumferential portion 132. Here, the number of inward teeth 132a in the outer rotor 130 is set so as to be greater than the number of outward teeth 124a in the inner rotor 120 by 1. Each inward tooth 132a is able to face each passage 113, 117 and each groove 114, 118 in the axial direction according to the rotation of the outer rotor 130, and thus is suppressed from clinging onto the recessed bottom portion 116c and the sliding surface portion 112b.

The inner rotor 120 is meshed with the outer rotor 130 with a relative eccentricity in the rotor eccentric direction De. Due to this, a plurality of connected pump chambers 140 are formed between the two rotors 120, 130 in the rotor housing chamber 156. The capacity of such pump chambers 140 increases and decreases due to the rotations of the outer rotor 130 and the inner rotor 120.

Specifically, as the two rotors 120, 130 rotate, the capacity of the connected pump chambers 140 which face the intake passage 113 and the intake groove 118 increases. As a result, fuel is sucked from the inlet port 112a through the intake passage 113, and into the pump chambers 140 in the rotor housing chamber 156. At this time, since the intake passage 113 widens as going from the start edge portion 113c toward the end edge portion 113d (refer to FIG. 3 as well), the amount of fuel sucked through this intake passage 113 corresponds to the capacity increase amount of the pump chambers 140.

As the two rotors 120, 130 to rotate, the capacity of the connected pump chambers 140 which face the discharge passage 117 and the discharge groove 114 reduces. As a result, at the same time as the above described suction function, fuel from the pump chambers 140 is discharged through the discharge passage 117 to outside of the rotor housing chamber 156. At this time, since the discharge passage 117 decreases in width as going from the start edge portion 117c toward the end edge portion 117d (refer to FIG. 5 as well), the amount of fuel discharged through this discharge passage 117 corresponds to the capacity reduction amount of the pump chambers 140.

In this regard, the fuel discharged through the discharge passage 117 into the motor housing portion 103 is discharged through the fuel passage 106 and from the discharge port 105b to outside.

Here, of the pump housing 111, an outer circumferential portion 170 of the pump cover 112, which includes both the sliding surface portion 112b and the inlet port 112a, will be explained in detail. As shown in FIG. 2, the outer circumferential portion 170 of the pump cover 112 is overall formed in a flange shape that protrudes in the outer circumferential side. This outer circumferential portion 170 includes a joining portion 172 and a recessed portion 174.

The joining portion 172 is provided over the entire circumference of the outer circumferential portion 170, on an outer circumferential edge at an opposite side from the rotor housing chamber 156. The joining portion 172 is joined with the narrowing portion 108 of the outer circumferential side housing 102. More specifically, regarding the narrowing portion 108 in an elastically deformed state of being bent toward an opposite side as the joining portion 172, an inner circumferential side surface 108a of this narrowing portion 108 abuts the joining portion 172 over the entire circumference.

Figure 4:
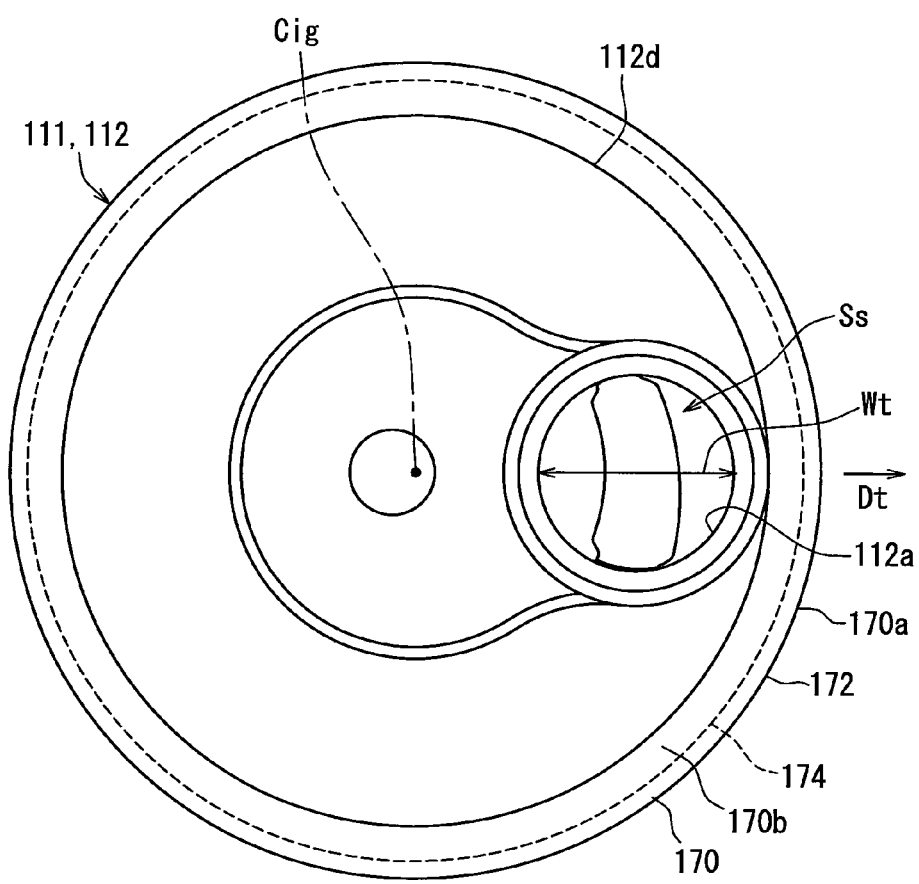
FIG. 4 is a directional view showing a pump cover from the IV direction of FIG. 3.

The recessed portion 174 is formed so as to be recessed adjacent to the joining portion 172. Specifically, the recessed portion 174 of the first embodiment recesses from an outer circumferential surface 170a toward the inner circumferential side in the radial direction. The outer circumferential surface 170a is disposed between the sliding surface portion 112b and the joining portion 172, and is a cylindrical shaped surface that faces toward the outer circumferential side. The recessed portion 174 is, as shown in FIGS. 3 and 4 in particular, disposed over the entire circumference of the outer circumferential portion 170. Further, the recessed portion 174 is, as shown in FIG. 2 in particular, a groove with a V-shaped cross section. Due to having this shape, the recessed portion 174 permits elastic deformation by the outer circumferential portion 170 even at the pump cover 112, which is formed by a base material of a rigid metal.

Figure 7:
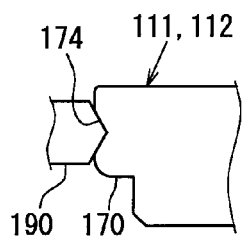
FIG. 7 is a view for explaining a recessed portion forming step when manufacturing a fuel pump according to a first embodiment.

In addition, a flat surface portion 170b is formed as a flange side surface on an inner circumferential side of the joining portion 172. The flat surface portion 170b is a toroid shaped flat surface that faces the outside. Next, a simple explanation is given for the main points when manufacturing the fuel pump 100. During a recessed portion forming step, the recessed portion 174 is formed in the pump cover 112. Specifically, as shown in FIG. 7, a V-shaped cutter 190 contacts and cuts the outer circumferential portion 170 of the pump cover 112, thereby forming the recessed portion 174 over the entire circumference.

Figure 8:
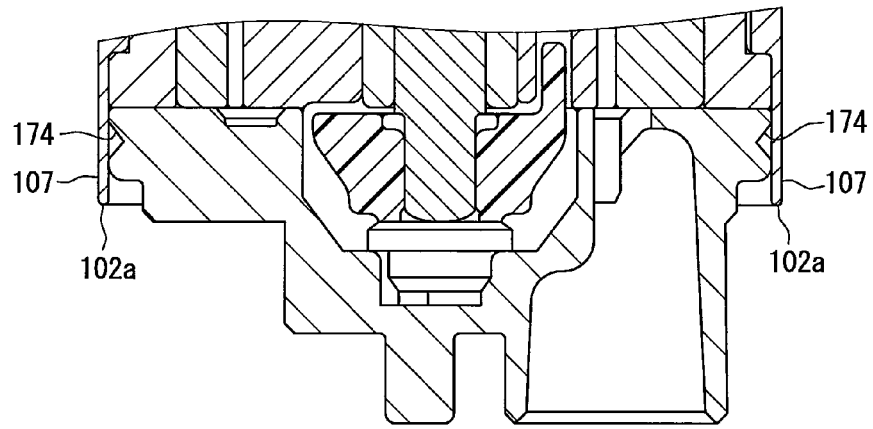
FIG. 8 is a view for explaining a positioning step when manufacturing a fuel pump according to a first embodiment.

Next, during a positioning step, the pump cover 112 is disposed toward the inner circumferential side from the outer circumferential side housing 102. Specifically, as shown in FIG. 8, an end portion 102a of the outer circumferential side housing 102 at the pump body 110 side has not yet formed the narrowing portion 108, and instead forms the cylindrical portion 107 with a constant diameter. Each component 111, 120, 130, 160 and the like of the pump body 110 is disposed on the inner circumferential side of this cylindrical portion 107. Of these, the pump cover 112 is disposed such that the outer circumferential portion 170 faces the end portion 102a in the radial direction.

Figure 9:
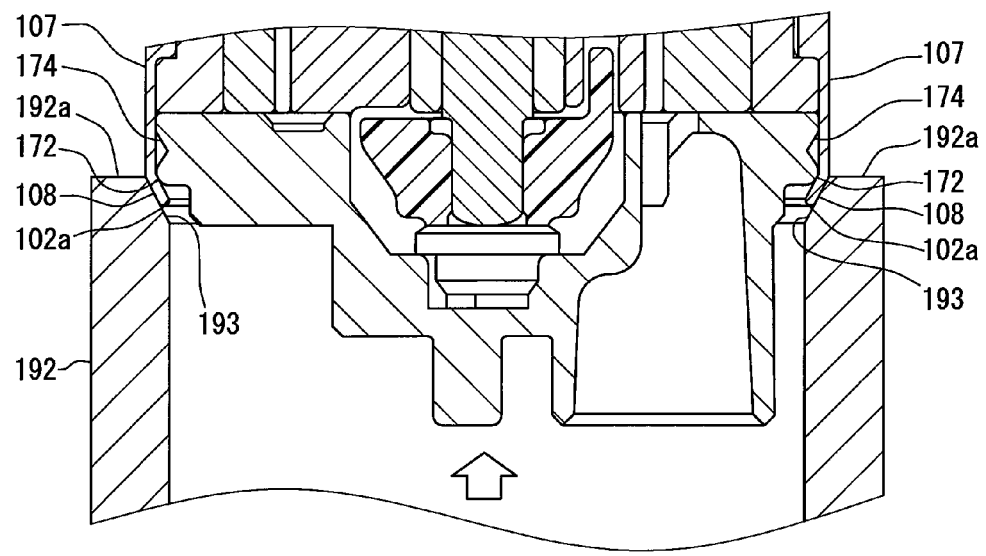
FIG. 9 is a view for explaining a joining step when manufacturing a fuel pump according to a first embodiment.

Next, during a joining step, the narrowing portion 108 is joined to the joining portion 172 by wrap caulking. Specifically, as shown in FIG. 9, using a cylindrical jig 192, the narrowing portion 108 is formed, and at the same time, the narrowing portion 108 is joined to the joining portion 172. The cylindrical jig 192 used here is formed in a cylindrical shape from a metal which is harder than the outer circumferential side housing 102. An end portion 192a of the cylindrical jig 192 which faces the cylindrical portion 107 includes, on the inner circumferential side, an inclined surface portion 193 which is shaped as a partial cone corresponding to the shape of the narrowing portion 108. Further, the outer diameter of the end portion 192a is set to be larger than the outer diameter of the cylindrical portion 107, and the inner diameter of the side on which the inclined surface portion 193 is disposed is set to be smaller than the inner diameter of the cylindrical portion 107.

Here, by pressing the end portion 192a of the cylindrical jig 192 against the end portion 102a of the cylindrical portion 107, the end portion 102a is bent toward the inner circumferential side. In other words, the end portion 102a is elastic-plastically deformed to form the narrowing portion 108 along the inclined surface portion 193. The narrowing portion 108 has a diameter which narrows down as compared to the cylindrical portion 107. At this time, the joining portion 172 receives force from the narrowing portion 108, but due to the adjacent recessed portion 174 which is recessed, the outer circumferential portion 170 is allowed to elastically deform. Meanwhile, the narrowing portion 108 also receives elastic counterforce from the outer circumferential portion 170, and elastically deforms, and is joined to the joining portion 172 while maintaining a tension force at or above a predetermined level.

Operation Effect

Next, operation effects of the first embodiment described above will be explained.

According to the first embodiment, the recessed portion 174 is recessed at a location adjacent to the joining portion 172 in the outer circumferential portion 170 of the pump cover 112 of the pump housing 111. Due to this, even when the joining portion 172 is joined to the narrowing portion 108 of the outer circumferential side housing 102, since the outer circumferential portion 170 is allowed to elastically deform due to the recessed portion 174, the force received from the narrowing portion 108 may be absorbed. As a result, it is difficult for this force to affect the sliding surface portion 112b. Specifically, the sliding surface portion 112b is suppressed from having a part thereof protrude toward the rotor housing chamber 156. Therefore, when the rotors 120, 130 rotate and slide on the sliding surface portion 112b, an increase in sliding resistance is suppressed. Due to this, the rotor 120 rotates smoothly, while fuel is sucked into the rotor housing chamber 156 and then discharged. Due to the above, it is possible to provide the fuel pump 100 that suppresses pump efficiency from decreasing.

Further, according to the first embodiment, the recessed portion 174 is disposed between the sliding surface portion 112b and the joining portion 172. Due to this, even when the joining portion 172 is joined to the narrowing portion 108, the force received from the narrowing portion 108 is absorbed by the recessed portion 174 between the sliding surface portion 112b. Accordingly, it is even more difficult for the sliding surface portion 112b to be affected.

Further, according to the first embodiment, the electric motor 180 and the joint member 160 are provided. The electric motor 180 includes the rotating shaft 180a that is driven to rotate, and the joint member 160 hooks up the rotating shaft 180a with the inner rotor 120 of the rotors, thereby causing the rotors 120, 130 to rotate. Further, the joint member 160 includes a body portion 162 and insertion portions 164. The body portion 162 is fitted with the rotating shaft 180a. The insertion portions 164 extend along the axial direction from locations of the body portion 162 which are more toward the outer circumferential side than the fitting location, and are inserted into the insertion holes 126 with a gap. The insertion holes 126 are recessed in the inner rotor 120 along the axial direction. In this configuration, when the rotating shaft 180a experiences an axial displacement due to, for example, vibrations from the vehicle or the like, this axial displacement may be absorbed by the gaps of the insertion holes 126.

Here, in order to house the body portion 162 of the joint member 160, the joint housing chamber 158 is disposed in the pump cover 112 of the pump housing 111. Due to the recessed portion 174 disposed in this kind of configuration, effects on the sliding surface portion 112b in the vicinity of the easy to protrude partition wall 112c may be suppressed.

Accordingly, by both absorbing axial displacements and suppressing protrusions toward the rotor housing chamber 156 of the sliding surface portion 112b, the rotors 120, 130 rotate smoothly, and pump efficiency is increased.

Further according to the first embodiment, the narrowing portion 108 and the joining portion 172 are provided over the entire circumference. Accordingly, due to joining the narrowing portion 108 to the joining portion 172, it is possible to suppress the pump housing 111 from rotation with respect to the outer circumferential side housing 102, and suppress a part of the sliding surface portion 112b from protruding toward the rotor housing chamber 156.

Further according to the first embodiment, the recessed portion 174 is provided over the entire circumference. Even when the recessed portion 174, which is provided over the entire circumference, is joined to the narrowing portion 108, the recessed portion 174, which is provided over the entire circumference, allows the outer circumferential portion 170 to elastically deform. Accordingly, the force received from the narrowing portion 108, which is provided over the entire circumference, is equalized in the circumferential direction. Due to this, it is possible to suppress the pump housing 111 from rotation with respect to the outer circumferential side housing 102, and suppress a part of the sliding surface portion 112b from protruding toward the rotor housing chamber 156.

Further according to the present embodiment, the recessed portion 174 is a groove having a V-shaped cross section. Due to this, the recessed portion 174 may be easily formed by cutting or the like, and it is possible to easily provide a fuel pump that suppresses pump efficiency from decreasing.

Second Embodiment

Figure 10:
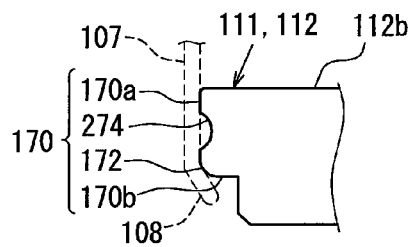
FIG. 10 is a partially expanded cross sectional view showing the vicinity of a recessed portion according to a second embodiment.

As shown in FIG. 10, the second embodiment is a modified example of the first embodiment. Regarding the second embodiment, the explanation will be focused on the points which differ from the first embodiment.

A recessed portion 274 of the second embodiment is, similar to the first embodiment, disposed to recess from the outer circumferential surface 170a toward the inner circumferential side in the radial direction. The outer circumferential surface 170a is disposed between the sliding surface portion 112b and the joining portion 172, and is a cylindrical shaped surface that faces toward the outer circumferential side. Further, the recessed portion 274 is disposed over the entire circumference of the outer circumferential portion 170.

However, as shown in FIG. 10, the recessed portion 274 of the second embodiment is a groove with an arc-shaped cross section. The radius of curvature of the cross section of this recessed portion 274 is substantially constant over all parts of this recessed portion 274.

In the second embodiment as well, the outer circumferential portion 170 includes the recessed portion 274 which is recessed adjacent to the joining portion 172 and which allows this outer circumferential portion 170 to elastically deform. Accordingly, the operation effects following the first embodiment may be exhibited.

Further, according to the second embodiment, the recessed portion 274 is a groove with an arc-shaped cross section. Due to this, even when the joining portion 172 is joined to the narrowing portion 108, it is possible to avoid reaction forces concentrating at one part of the recessed portion 274, and it is more difficult to affect the sliding surface portion 112b.

Third Embodiment

Figure 11:
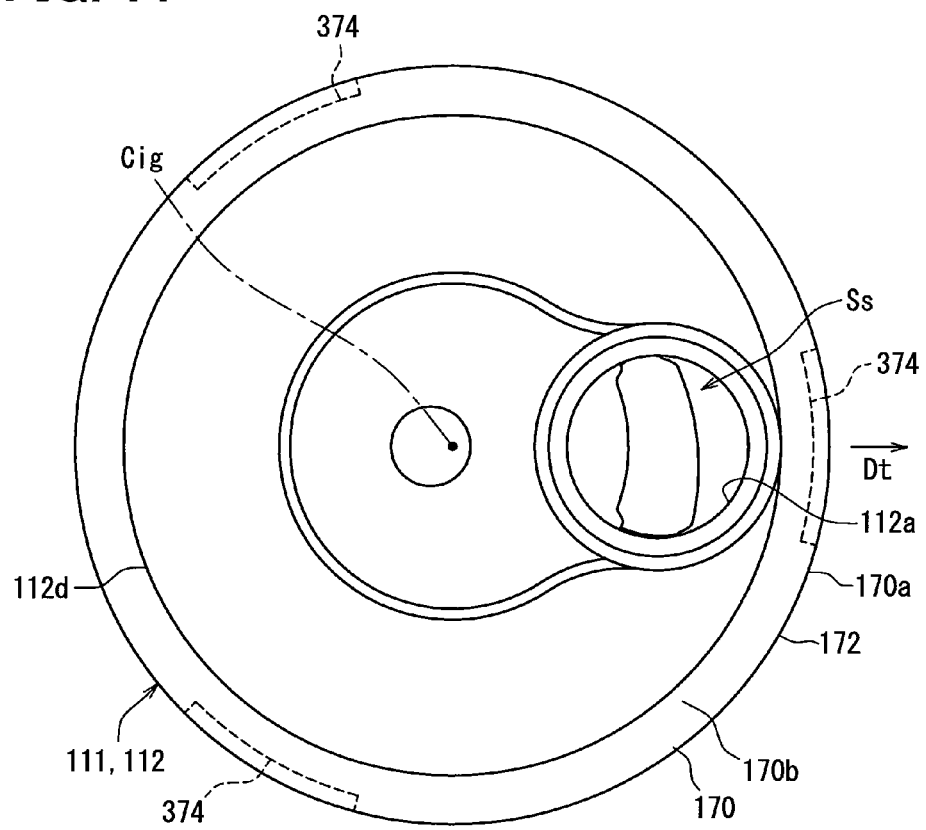
FIG. 11 is a view corresponding to FIG. 4 according to a third embodiment.

As shown in FIG. 11, the third embodiment is a modified example of the first embodiment. Regarding the third embodiment, the explanation will be focused on the points which differ from the first embodiment.

A recessed portion 374 of the second embodiment is, similar to the first embodiment, disposed to recess from the outer circumferential surface 170a toward the inner circumferential side in the radial direction. The outer circumferential surface 170a is disposed between the sliding surface portion 112b and the joining portion 172, and is a cylindrical shaped surface that faces toward the outer circumferential side. Further, the recessed portion 374 is a groove with a V-shaped cross section.

However, as shown in FIG. 11, the recessed portion 374 of the third embodiment is not disposed over the entire circumference of the outer circumferential portion 170, and is disposed at a portion of the circumferential direction of the outer circumferential portion 170. More specifically, the recessed portion 374 is disposed in a plurality of locations with even spacing in the circumferential direction of the outer circumferential portion 170. In particular, in the present embodiment, the recessed portion 374 is disposed in 3 locations with a 120° spacing.

One of the three locations of the recessed portion 374 is disposed outward of the inlet port 112a in the inlet port eccentric direction Dt with respect to the pump cover 112. Due to such a placement, the recessed portion 374, even if overall, is disposed to include the outward side of the inlet port 112a in the inlet port eccentric direction Dt.

In the third embodiment as well, the outer circumferential portion 170 includes the recessed portion 374 which is recessed adjacent to the joining portion 172 and which allows this outer circumferential portion 170 to elastically deform. Accordingly, the operation effects following the first embodiment may be exhibited.

In addition, according to the third embodiment, the recessed portion 374 is at a portion of the circumferential direction of the outer circumferential portion 170, and is disposed to include the outward side of the inlet port 112a in the inlet port eccentric direction Dt. Due to the recessed portion 374 including the outward side of the inlet port 112a, effects on the sliding surface portion 112b in the vicinity of the easy to protrude partition wall 112c may be suppressed.

Other Embodiments

Above, a plurality of embodiments of the present disclosure are explained, but the present disclosure is not limited to these embodiments, and a variety of embodiments and combinations, which do not depart from the gist of the present disclosure, are contemplated.

Figure 12:
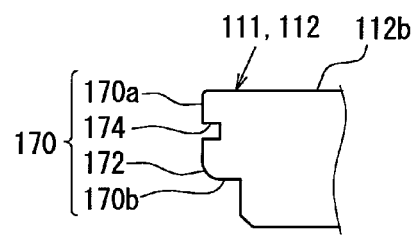
FIG. 12 is a view corresponding to FIG. 10 according to one example of a first modified example.
Figure 13:
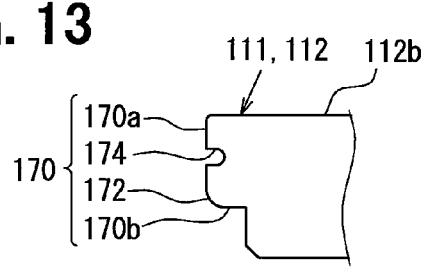
FIG. 13 is a view corresponding to FIG. 10 according to one example of a first modified example.
Figure 14:
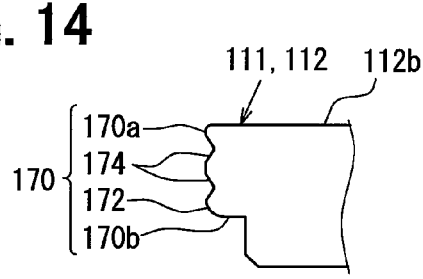
FIG. 14 is a view corresponding to FIG. 10 according to one example of a first modified example.
Figure 15:
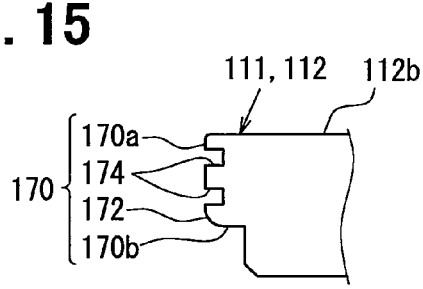
FIG. 15 is a view corresponding to FIG. 10 according to one example of a first modified example.

Specifically, as a first modified example, a variety of shapes may be used as the cross sectional shape of the recessed portion 174. As this example, as shown in FIG. 12, the recessed portion 174 may be a groove with a rectangular shaped cross section. Further, as shown in FIG. 13, the recessed portion 174 may be a groove with a U-shaped cross section. Further, as shown in FIG. 14, the recessed portion 174 may be grooves with V-shaped cross sections lined up in two locations in the axial direction. Further, as shown in FIG. 15, the recessed portion 174 may be grooves with rectangular shaped cross sections lined up in two locations in the axial direction.

Figure 16:
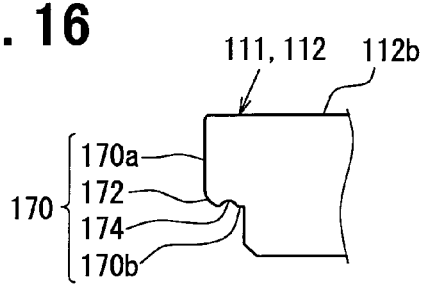
FIG. 16 is a view corresponding to FIG. 10 according to a second modified example

As a second modified example, as long as the recessed portion 174 is a recess adjacent to the joining portion, the recessed portion 174 may be something that does not recess from the outer circumferential surface 170a toward the inner circumferential side in the radial direction, the outer circumferential surface 170a being disposed between the sliding surface portion 112b and the joining portion 172, and is a cylindrical shaped surface that faces toward the outer circumferential side. As this example, as shown in FIG. 16, the recessed portion 174 may recess from the flat surface portion 170b toward the sliding surface portion 112b in the axial direction. The flat surface portion 170b is disposed toward the inner circumferential side as compared to the joining portion 172, and is a toroid shaped flat surface that faces the outside. This kind of a recessed portion 174 also allows the outer circumferential portion 170 to elastically deform. Further, this recessed portion 174 is disposed along the flat surface portion 170b over the entire circumference of the outer circumferential portion 170, and is a groove with a V-shaped cross section.

Figure 17:
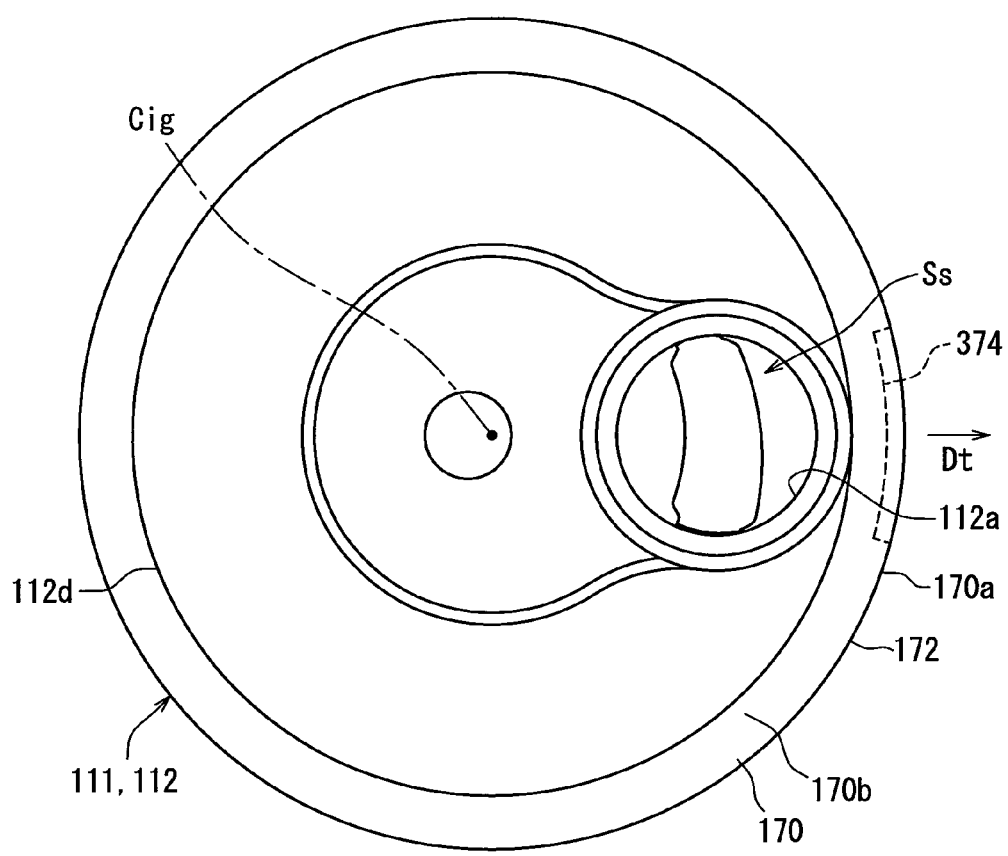
FIG. 17 is a view corresponding to FIG. 4 according to one example of a third modified example.
Figure 18:
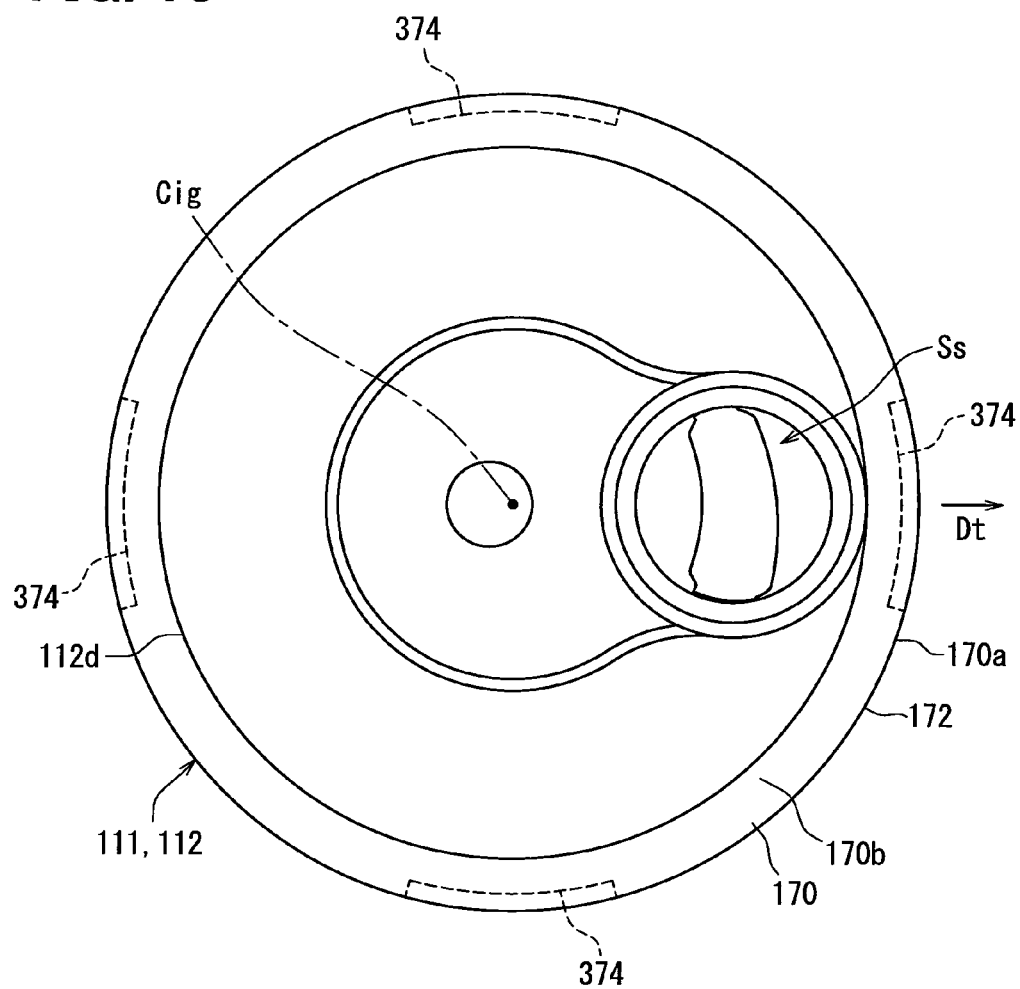
FIG. 18 is a view corresponding to FIG. 4 according to one example of a third modified example.

As a third modified example related to the third embodiment, as long as the recessed portion 374 is disposed at a portion of the circumferential direction of the outer circumferential portion 170, a variety of embodiments may be used. As shown in FIG. 17, the recessed portion 374 may be disposed at 1 location outward of the inlet port 112a in the inlet port eccentric direction Dt with respect to the pump cover 112. In the example shown in FIG. 18, the recessed portion 374 is disposed in 4 locations with a 90° spacing, and of these, one location is disposed outward of the inlet port 112a in the inlet port eccentric direction Dt. As other examples of this, the recessed portion 374 may be disposed in 2 locations with a 180° spacing. Alternatively, the recessed portion 374 may be disposed in a plurality of locations with an uneven spacing. Further, the recessed portion 374 may be disposed away from outward of the inlet port 112a in the inlet port eccentric direction Dt.

As a fourth modified example, the narrowing portion 108 and the joining portion 172 may be not disposed over the entire circumference, and instead be disposed only at a portion of the circumferential direction.

As a fifth modified example, the fuel pump 100 may have the rotating shaft 180a be directly connected to the inner rotor 120, without providing the joint member 160. Accordingly, the present disclosure is applicable to a pump cover 112 that does not include the joint housing chamber 158.

As a sixth modified example, a pump cover may have the sliding surface portion 112b and, in place of the inlet port 112a which is a fuel port, a discharge outlet that discharges fuel from the rotor housing chamber 156 on a same side in the axial direction as the rotor housing chamber 156.

As a seventh modified example, as long as the pump body 110 sucks in fuel from a rotor housing chamber and discharges the fuel through a discharge passage due to rotors rotating, things other than trochoid gears may be used as the pump body 110. For example, fuel may be sucked into a rotor housing chamber and then discharged by rotating an impellor as a rotor, without providing an outer rotor.

As an eighth modified example, the fuel pump 100 may suck in and discharge gasoline, or a liquid fuel based on this, as fuel, instead of diesel fuel.

As a ninth modified example, the forming of the recessed portion 174 in the pump cover 112 may be performed other than during the cutting step by the cutter 190, e.g., during a metal injection step or a lost-wax step.

The invention claimed is:

1. A fuel pump, comprising:
a rotor that rotates;
a pump housing that interposes the rotor from both sides in an axial direction, the pump housing
defining a rotor housing chamber that rotatably houses the rotor,
including a joint housing chamber that houses a body portion configured to be fitted with a rotating shaft, and
including a partition wall; and
an outer circumferential side housing that includes
a cylindrical portion formed in a cylindrical shape that surrounds the pump housing from an outer circumferential side, and
a narrowing portion having a diameter that narrows down with respect to a diameter of the cylindrical portion; wherein
fuel is sucked into the rotor housing chamber and then discharged due to the rotor rotating,
the pump housing includes
a fuel port that sucks the fuel into and discharges the fuel out of the rotor housing chamber, and
a sliding surface portion on which the rotor slides,
an outer circumferential portion of the pump housing includes
a joining portion joined to the narrowing portion, and
a recessed portion that is recessed adjacent to the joining portion, the recessed portion allowing the outer circumferential portion to elastically deform, wherein the joining portion and the recess portion are integral components of the outer circumferential portion, and
the partition wall forms a part of the sliding surface portion and separates the fuel port and the joint housing chamber.

2. The fuel pump of claim 1, wherein
the recessed portion is disposed between the sliding surface portion and the joining portion.

3. The fuel pump of claim 1, further comprising:
an electric motor that includes the rotating shaft which is driven to rotate; and
a joint member that hooks up the rotating shaft to the rotor, thereby causing the rotor to rotate, wherein
the rotor includes an insertion hole that is recessed along the axial direction, and
the joint member includes
a body portion fitted with the rotating shaft, and
an insertion portion that extends along the axial direction from a location more toward an outer circumferential side than a fitting location of the body portion, the insertion portion being inserted into the insertion hole with a gap.

4. The fuel pump of claim 1, wherein
the narrowing portion and the joining portion are disposed over an entire circumference.

5. The fuel pump of claim 4, wherein
the recessed portion is disposed over the entire circumference.

6. The fuel pump of claim 1, wherein
the fuel port is disposed eccentrically with respect to the pump housing in an eccentric direction, and
the recessed portion is disposed in a portion of the circumferential direction of the outer circumferential portion, the recessed portion including an outward side of the fuel port in the eccentric direction.

7. The fuel pump of claim 1, wherein
The recessed portion is a groove having a V-shaped cross section.

8. The fuel pump of claim 1, wherein
The recessed portion is a groove having an arc-shaped cross section.

* * * * *